(12) United States Patent
Callahan et al.

(10) Patent No.: US 7,584,938 B2
(45) Date of Patent: Sep. 8, 2009

(54) SIDE LOADED VALVE ASSEMBLY

(75) Inventors: Joseph Callahan, Greenwood, IN (US); Kwin Abram, Columbus, IN (US); Ivan Arbuckle, Columbus, IN (US); Robin Willats, Columbus, IN (US)

(73) Assignee: Emcon Technologies, LLC, Wilmington, DE (US)

( * ) Notice: Subject to any disclaimer, the term of this patent is extended or adjusted under 35 U.S.C. 154(b) by 261 days.

(21) Appl. No.: 11/488,950

(22) Filed: Jul. 19, 2006

(65) Prior Publication Data

US 2008/0017815 A1 Jan. 24, 2008

(51) Int. Cl.
*F16K 1/22* (2006.01)

(52) U.S. Cl. .......................... 251/305; 251/279; 251/77

(58) Field of Classification Search ............... 251/77, 251/279, 305, 335.2
See application file for complete search history.

(56) References Cited

U.S. PATENT DOCUMENTS

| 1,519,517 | A | * | 12/1924 | Thayer | ................... 251/76 |
| 4,955,581 | A | * | 9/1990 | Dukas, Jr. | ................. 251/214 |
| 5,401,001 | A | * | 3/1995 | Cook et al. | ................ 251/308 |

\* cited by examiner

*Primary Examiner*—John K Fristoe, Jr.
(74) *Attorney, Agent, or Firm*—Carlson, Gaskey & Olds

(57) ABSTRACT

An exhaust valve assembly includes a valve body, a valve supported by a shaft within the valve body, and an actuator that drives the shaft to move the valve relative to the valve body. A side load feature engages one portion of the shaft to reduce valve chatter by side loading the shaft.

18 Claims, 1 Drawing Sheet

US 7,584,938 B2

SIDE LOADED VALVE ASSEMBLY

TECHNICAL FIELD

The subject invention relates an exhaust valve assembly with a side loaded shaft that provides reduced valve chatter.

BACKGROUND OF THE INVENTION

Exhaust valve assemblies include a flapper valve that is supported on a shaft within an exhaust tube. An actuator drives the shaft to move the flapper valve within the exhaust tube to control exhaust flow. Actuators can include spring actuators, electric actuators such as motors or solenoids, or vacuum actuators, for example. The shaft is supported by bushings such that the shaft and flapper valve can pivot together about an axis.

The actuator provides a driving output to the shaft to pivot the flapper valve between an open and closed position within the exhaust tube. When the flapper valve is in the closed position, there is a tendency for the flapper valve to generate a chattering noise, which is not desirable. This chattering behavior is a result of the movement of the flapper valve, driven by exhaust pulsations, such that the shaft moves within a clearance of the bushings. This movement generates the chattering noise and can also lead to durability issues for the bushings and associated exhaust valve components.

It is know that pre-loading the shaft results in reduced valve chatter. One proposed solution has been to utilize a spring and cable assembly to preload the shaft. The spring and cable assembly is coupled to each end of the shaft. A first cable is attached to one shaft end, a second cable is attached to an opposite shaft end, and a spring couples the first and second cables to each other. The spring is resiliently biased to pull the first and second cables toward each other, such that preload forces are exerted on both ends of the shaft.

One disadvantage with this assembly is that it is difficult to package efficiently within an exhaust component. Also, the need for both shaft ends to be coupled to the spring and cable assembly further complicates the assembly process.

Thus, there is a need an exhaust valve assembly that reduces valve chatter, and which can be easily packaged within an exhaust component.

SUMMARY OF THE INVENTION

An exhaust valve assembly includes a side load feature that is used to reduce valve chatter. The exhaust valve assembly comprises a valve that is supported by a shaft within a valve body. An actuator drives the shaft to move the valve within the valve body to control exhaust flow. The side load feature engages one portion of the shaft to side load the shaft.

In one example, the shaft comprises a valve shaft that is attached to the valve. The actuator has an actuator shaft that forms an output from the actuator. The side load feature comprises a coupling that couples the actuator shaft to one end of the valve shaft. To generate the side loading, the valve shaft and the actuator shafts are offset from each other. The coupling preferably comprises a bellows that compensates for the offset and provides torque transfer between the actuator and the valve. In one example, the coupling comprises a flexible metal bellows.

In another example, the side load feature comprises a resilient member and contact element that abuts against the shaft. The contact element comprises a bearing element that does not hinder shaft rotation. The contact element engages the shaft at a central location between first and second shaft ends.

In each of these examples, the side load feature provides a simple and cost-effective mechanism for side loading the shaft to reduce valve chatter. These and other features of the present invention can be best understood from the following specification and drawings, the following of which is a brief description.

DETAILED DESCRIPTION OF THE PREFERRED EMBODIMENT

Figure 1:
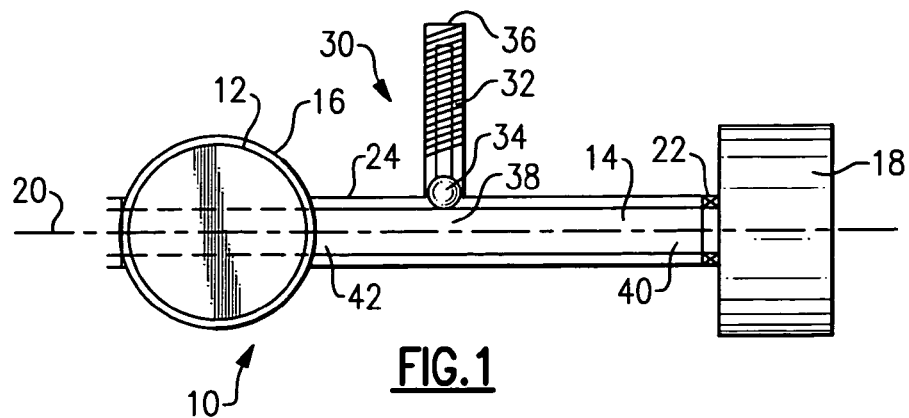
FIG. 1 is a schematic view of one example of an exhaust valve assembly incorporating the subject invention.

An exhaust valve assembly is shown generally at 10 in FIG. 1. The exhaust valve assembly 10 includes a valve 12 that is supported on a shaft 14. In the example shown, the valve 12 comprises a flapper valve that is mounted within a valve body 16, which comprises a tube. The valve body 16 is part of an exhaust system component and exhaust gases flow through the valve body 16.

An actuator 18 drives the shaft 14 to rotate about an axis 20 defined by the shaft 14. At least one bearing or bushing 22 supports the shaft 14 for rotation relative to a shaft housing 24. The shaft housing 24 is part of, or attached to, the valve body 16. The valve 12 is fixed to the shaft 14 such that the shaft 14 and valve 12 pivot about the axis 20 together. The actuator 18 can be any type of actuator including a spring actuator, an electric actuator such as a motor or solenoid, or a vacuum actuator, for example. The actuator 18 pivots the valve 12 between open and closed positions to control exhaust flow through the valve body 16 as known.

When in the closed position, the valve 12 is prone to chatter. This chattering noise is generated in response to movement of the valve 12, caused by exhaust pulsations, within clearance of the bushings 22. In order to reduce valve chatter under these conditions, the exhaust valve assembly 10 includes a side load feature 30. The side load feature 30 engages one portion of the shaft 14 to reduce valve chatter by side loading the shaft 14.

The side load feature 30 can be provided in many different configurations. In the example shown in FIG. 1, the side load feature comprises a resilient element such as a spring 32 and a contact element 34. In the example shown, the spring 32 is positioned to extend radially outwardly from the axis 20 and is nominally perpendicular to the shaft 14. The spring 32 is resiliently biased to force the contact element 34 to abut directly against the shaft 14. This applies a small but consistent side load to the shaft 14. Preferably, the contact element 34 comprises a smooth and movable element, such as a ball bearing for example, so that shaft movement is not hindered.

The spring 32 and contact element 34 are housed within a slot or tube 36 that is supported by the shaft housing 24. The tube 36 defines a linear actuation path for the spring 32 and prevents the spring 32 and contact element 34 from moving in a lateral direction along the axis 20. The contact element 34 solely engages a central portion 38 of the shaft 14 located somewhere between first 40 and second 42 shaft ends.

The configuration shown in FIG. 1 takes up less packaging space than the prior art spring and cable configuration, is easier to manufacture, and can be applied to an external valve design without risk of exposure of elements such as that in the spring and cable configuration.

Figure 2:
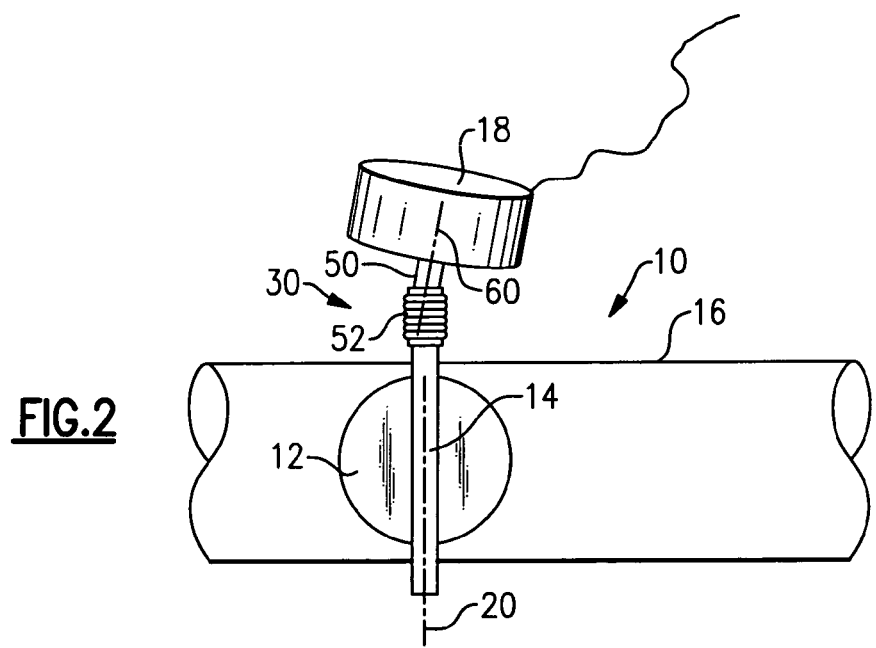
FIG. 2 is a schematic view of another example of an exhaust valve assembly incorporating the subject invention.

In the example of FIG. 2, the shaft 14 comprises a valve shaft and the actuator 18 includes an actuator shaft 50 that comprises a driving output from the actuator 18. The side load feature 30 comprises a coupling 52 that couples the actuator shaft 50 to one end of the valve shaft 14 to transfer torque between the actuator 18 and the valve 12. To generate the side loading, the valve shaft and the actuator shafts 14, 50 are offset from each other, i.e. the actuator shaft 50 and valve shaft 14 are not co-axial. The coupling 52 preferably comprises a bellows that compensates for the offset and provides torque transfer between the actuator 18 and the valve 12. In the example shown, the coupling 52 comprises a flexible or resilient bellows, however, other types of couplings could also be used. In one example, the bellows is comprised of a metallic material, however, other materials could also be used.

In the example of FIG. 2, the actuator shaft 50 defines an actuator axis 60. The offset in the configuration of FIG. 2 is in the form of an angular displacement. As such, the actuator axis 60 is transverse to the axis 20 defined by the valve shaft 14. The bellows compensates for this angular offset to allow torque transfer while additionally providing the side load to the valve shaft 14 to reduce valve chatter.

Figure 3:
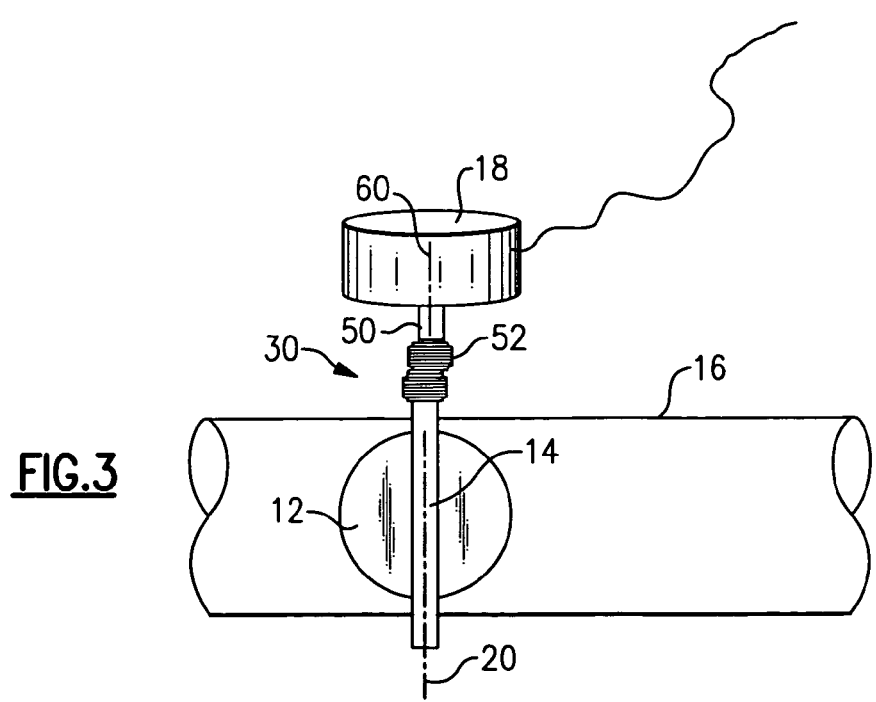
FIG. 3 is a schematic view of another example of an exhaust valve assembly incorporating the subject invention.

The configuration of FIG. 3 is similar to FIG. 2 but the offset is in the form of a lateral displacement. As shown in this configuration, the bellows is a resilient member that includes offset portions with an angled portion extending between the offset portions. Optionally, the bellows could comprise an angled body extending between the shafts 14, 50. In this example, the actuator axis 60 is parallel to and spaced apart from the axis 20 of the valve shaft 14. Again, the bellows compensates for the lateral offset to allow torque transfer while additionally providing the side load to the valve shaft 14 to reduce valve chatter.

Although a preferred embodiment of this invention has been disclosed, a worker of ordinary skill in this art would recognize that certain modifications would come within the scope of this invention. For that reason, the following claims should be studied to determine the true scope and content of this invention.

What is claimed is:

1. An exhaust valve assembly comprising:
   a valve body;
   a valve supported by a shaft for movement within said valve body, said shaft comprising a valve shaft that defines a valve shaft axis of rotation;
   an actuator that drives said shaft to vary a position of said valve within said valve body to control exhaust flow, and wherein said actuator includes an actuator shaft that defines an actuator shaft axis of rotation; and
   a side load feature that engages one portion of said shaft to reduce valve chatter by side loading said shaft, said side load feature comprising a resilient member that exerts a side load force against said valve shaft.

2. The exhaust valve assembly according to claim 1 wherein said side load force is transverse to said valve shaft axis of rotation.

3. The exhaust valve assembly according to claim 2 wherein said one portion of said valve shaft solely comprises one of a single end portion and a central portion.

4. The exhaust valve assembly according to claim 3 wherein said side load feature comprises said resilient member and includes a contact element that abuts against said valve shaft.

5. The exhaust valve assembly according to claim 4 wherein said contact element comprises a ball bearing that contacts said valve shaft such that said valve shaft can rotate relative to said ball bearing.

6. The exhaust valve assembly according to claim 4 wherein said one portion of said valve shaft comprises said central portion of said valve shaft, said central portion being located between first and second shaft ends.

7. The exhaust valve assembly according to claim 4 wherein said resilient member extends radially outwardly from said valve shaft axis of rotation.

8. The exhaust valve assembly according to claim 3 wherein said resilient member comprises a coupling device that couples said valve shaft and said actuator shaft together.

9. The exhaust valve assembly according to claim 8 wherein said actuator shaft is offset from said valve shaft such that said actuator shaft is not co-axial with said valve shaft axis of rotation.

10. The exhaust valve assembly according to claim 8 wherein said actuator shaft axis of rotation is parallel to and spaced apart from said valve shaft axis of rotation.

11. The exhaust valve assembly according to claim 8 wherein said actuator shaft axis of rotation is transverse to said valve shaft axis of rotation.

12. The exhaust valve assembly according to claim 8 wherein said one portion of said valve shaft comprises said single end portion.

13. The exhaust valve assembly according to claim 1 wherein said resilient member comprises one of a coupling device that couples said valve shaft and said actuator shaft together or a spring that extends radially outwardly relative to said valve shaft axis of rotation.

14. The exhaust valve assembly according to claim 13 wherein said resilient member comprises said coupling device and wherein said coupling device directly couples one end of said actuator shaft to one end of said valve shaft.

15. The exhaust valve assembly according to claim 14 wherein said coupling device comprises a bellows.

16. The exhaust valve assembly according to claim 13 wherein said valve shaft axis of rotation is non-coaxial with said actuator shaft axis of rotation.

17. An exhaust valve assembly comprising:
   a valve body;
   a valve supported by a shaft for movement within said valve body, said shaft defining an axis of rotation;
   an actuator that drives said shaft to vary a position of said valve within said valve body to control exhaust flow;
   a side load feature that engages one portion of said shaft to reduce valve chatter by side loading said shaft, wherein said one portion of said shaft solely comprises one of a single end portion and a central portion, and wherein said side load feature exerts a side load force that is transverse to said axis of rotation; and
   wherein said shaft comprises a valve shaft and wherein said actuator includes an actuator shaft, said side load feature comprising a coupling device that couples said valve shaft and said actuator shaft together, and wherein said coupling device comprises a bellows.

18. An exhaust valve assembly comprising:
   a valve body;
   a valve supported by a shaft for movement within said valve body;
   an actuator that drives said shaft to vary a position of said valve within said valve body to control exhaust flow; and
   a side load feature that engages one portion of said shaft to reduce valve chatter by side loading said shaft wherein said side load feature comprises a resilient bellows that couples said shaft to an actuator shaft driven by said actuator.

* * * * *